Dec. 10, 1946.   J. O. EDSON ET AL   2,412,210
CATHODE RAY SWEEP CIRCUIT
Filed March 21, 1942   2 Sheets-Sheet 2
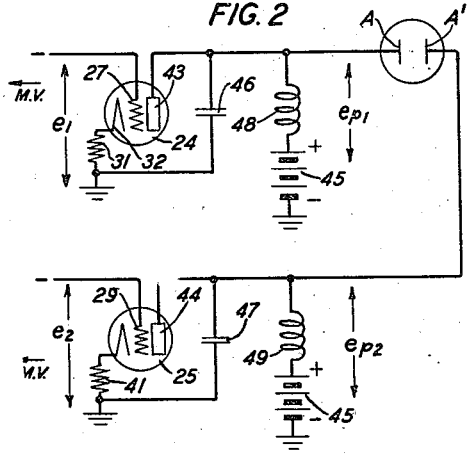
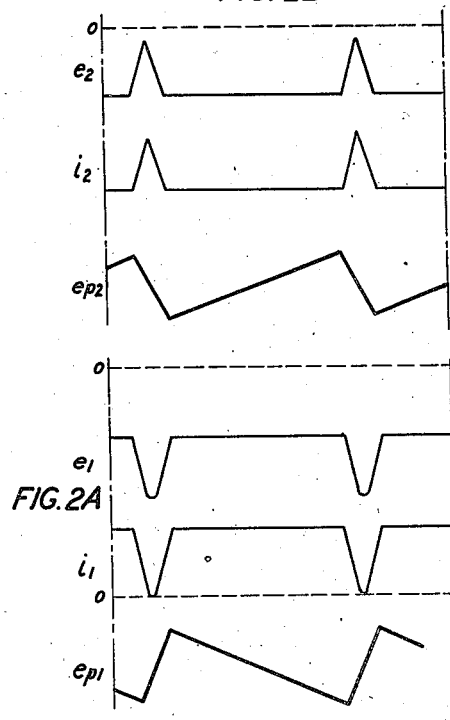
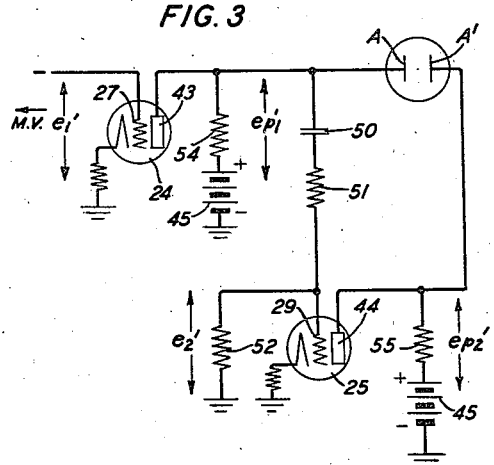
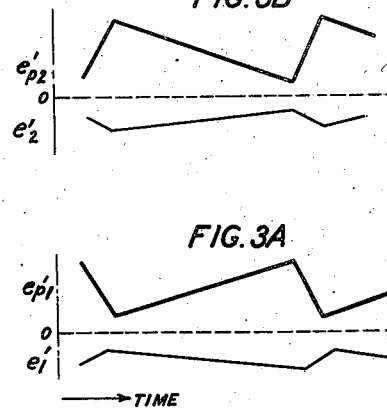
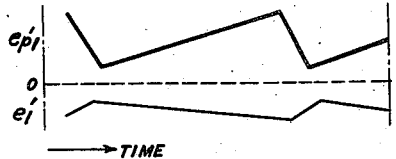
INVENTORS: J. O. EDSON
W. A. EDSON
J. B. MAGGIO
BY
ATTORNEY Patented Dec. 10, 1946

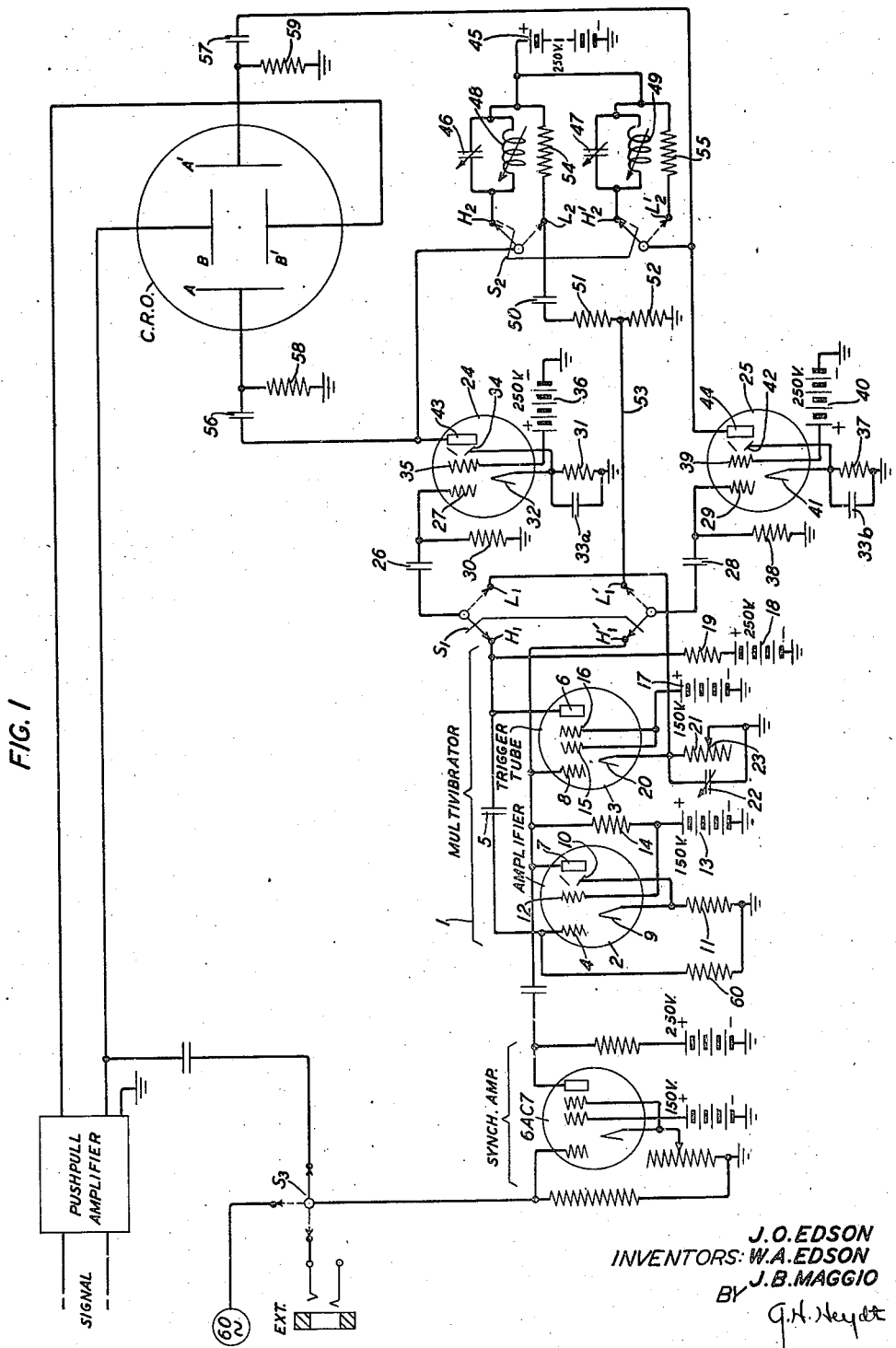

2,412,210

UNITED STATES PATENT OFFICE 2,412,210

CATHODE-RAY SWEEP CIRCUIT

James O. Edson, Great Kills, N. Y., William A. Edson, Chicago, Ill., and John B. Maggio, Summit, N. J., assignors to Bell Telephone Laboratories, Incorporated, New York, N. Y., a corporation of New York Application March 21, 1942, Serial No. 435,688

4 Claims. (Cl. 315—26)

This invention relates to an improvement in cathode ray oscilloscope sweep circuits, particularly those in which it is desired to provide balanced saw-tooth voltages on a pair of horizontal deflecting plates in the oscilloscope.

The recognized advantage of such balanced deflecting voltages is that their use eliminates the impairment of definition of the electron spot attendant on the application of an unbalanced voltage to the sweep plates. There are numerous patents which disclose circuits for the generation of balanced sweep voltages. Among them may be mentioned United States Patent 2,209,199 to F. Gray, July 23, 1940. The use of vacuum tubes to amplify the generated sweep voltage is also well-known, whether the amplified voltage is to be applied to static deflecting plates or to the terminals of a deflecting coil. An example of the latter use is disclosed in W. O. Osbon's United States Patent 1,934,322, November 7, 1933.

However, it does not appear that the circuits known to the prior art include provision for the choice of the sweep voltage amplifying circuit best adapted to the particular sweep frequency selected. Such a provision becomes important when it is desired to employ with uniform efficiency and greatest economy of apparatus amplified sweep voltages of frequencies varying from the subaudible to the ultra-high.

It is an object of the present invention to provide a balanced cathode ray sweep circuit including means for generating sweep voltages ranging in frequency from a few cycles to several megacycles per second, coupled with amplifying means for applying these voltages in balanced saw-tooth form to the horizontal deflecting plates of a cathode ray oscilloscope and including provision for selecting the amplifying circuit connection most efficient for the desired frequency of sweep.

A suitable apparatus for the generation of recurrent pulses of the desired frequency of recurrence is an asymmetrical multivibrator using hard vacuum tubes such as that disclosed, for example, in United States Patent 1,978,461, October 30, 1934, to P. L. Hoover et al. The generation by this device of recurrent pulses is due to the mutual interactions of the two vacuum tubes which are commonly called the amplifier tube and the trigger tube, respectively. In the operation of such a multivibrator, momentary voltage pulses of short duration in comparison with their period of recurrence appear simultaneously but with opposite polarities on the anode and on the grid of the multivibrator trigger tube, the anode pulse being negative, while the grid pulse is positive. Either of these pulses may be used to effect production of saw-tooth voltage waves in the output circuit of the vacuum tube to which the multivibrator is suitably connected. For the purpose of a balanced circuit it is desirable to make use of both positive and negative voltage pulses at the same time.

Accordingly, another object of the present invention is to provide means including a pair of vacuum tubes whereby the momentary voltage pulses appearing in opposite phase on the grid and on the anode of the trigger tube of an asymmetrical multivibrator may be transformed into balanced saw-tooth voltages on the sweep plates of the cathode ray oscilloscope.

Between ground and the cathode of the trigger tube is the sweep frequency determining circuit comprising in parallel an adjustable resistor and an adjustable condenser. Across the terminals of this circuit there appears in the operation of the multivibrator a saw-tooth voltage wave of frequency determined by the values of capacitance and resistance between cathode and ground and this saw-tooth wave may be directly amplified as desired. Where a balanced voltage is to be derived from the cathode-to-ground circuit, the pair of amplifying tubes are supplied with a phase inverting input circuit.

It is, therefore, a further object of the invention to provide switching means permitting the selection of either the instantaneous grid and anode pulses above-mentioned or the saw-tooth voltage between trigger cathode and ground as a source from which to derive balanced voltages for application to the sweep plates of the oscilloscope.

It has been found possible to use the same pair of amplifying tubes for the utilization of either source of sweep voltage, providing, of course, these tubes with the input and output circuits appropriate to the source selected. The switching means, later to be described, simultaneously select the sweep voltage source and the amplifying circuit adapted thereto, thereby attaining another object of the invention, namely, to provide a circuit capable of utilizing with the greatest economy of apparatus any source of sweep voltage obtainable from a multivibrator.

How these objects are attained by the present invention will be clearly shown in the following description thereof with the aid of the accompanying drawings in all of which like parts are designated by the same numerals or letters, and in which:

Fig. 1 is a diagram of a complete circuit of the invention;

Fig. 2 is a schematic circuit illustrating the connection of the amplifying tubes of Fig. 1 adapted to utilize simultaneously pulses of opposite polarity arising on grid and anode of a multivibrator trigger tube;

Figs. 2A and 2B are representations of the grid voltages, plate currents and plate voltages in the circuit of Fig. 2;

Fig. 3 is a schematic circuit illustrating the connection of the amplifying tubes of Fig. 1 adapted to amplify saw-tooth voltages in the cathode-to-ground circuit of a multivibrator trigger tube;

Figs. 3A and 3B are representations of the grid and plate voltages in the circuit of Fig. 3.

For the sake of simplicity, beam power tubes 24 and 25 of Fig. 1 are represented by triodes similarly identified in Figs. 2 and 3.

Referring to Fig. 1, multivibrator 1 comprises amplifier 2 and trigger tube 3, suitably a beam power tube and a pentode, for example a 6Y6G and a 6AC7, respectively. Control grid 4 of tube 2 is connected to ground through grid leak 60 as shown (0.5 megohm) and through condenser 5 to anode 6 of tube 3 and to contact $H_1$ of switch $S_1$. Anode 7 of tube 2 is directly connected to grid 8 of tube 3 and to contact $H_1'$ of switch $S_1$. Cathode 9 and beam-forming plates 10 of tube 2 are connected together and through resistor 11 to ground. Screen grid 12 of tube 2 is at a potential 150 volts positive to ground provided by battery 13. Battery 13 also supplies power to anode 7 of tube 2 through resistor 14.

In tube 3 of multivibrator 1 screen grid 15 and suppressor grid 16 are connected to each other and to a source of potential 150 volts positive to ground which may be supplied from separate battery 17 as shown or, if preferred, from battery 13. Anode 6 of tube 3 is supplied from 250-volt battery 18 through resistor 19. Cathode 20 of tube 3 is connected to ground through a portion (selected by tap 23) of potentiometer 21 in parallel with variable condenser 22. Cathode 20 is at the same time connected to point $L_1$ of switch $S_1$.

Suitable values of resistances and capacitances in the above-described circuit are as in the following table, wherein $C_4$ is the capacitance of coupling condenser 5; $R_{11}$ is the resistance of cathode resistor 11, etc.

$C_5$—0.1 microfarad
$C_{22}$—4 microfarads to 10 micromicrofarads
$R_{11}$—100 ohms
$R_{14}$—500 ohms
$R_{19}$—800 ohms
$R_{21}$—0.5 megohm It will be recognized that the above circuit is that of an asymmetrical multivibrator. For a description of the operation of such a circuit reference may be made to United States Patent 1,978,461 above-mentioned, or to the article entitled "Trigger circuits," by H. J. Reich, in "Electronics," August 1939, page 14. Since the multivibrator circuit is in itself no part of the present invention, it will be sufficient hereinto point out the recurrent voltages appearing in its operation.

A recurrent saw-tooth voltage appears across the terminals of variable condenser 22 in the cathode circuit of trigger tube 3, the frequency of recurrence of this voltage being determined by the simultaneous values of $C_{22}$ and the portion of $R_{21}$ included between cathode 20 and tap 23. When the multivibrator circuit is in operation, condenser 22 is only fractionally discharged in each cycle and with the circuit elements recited above, the time required for this fractional discharge can be reduced to the order of 0.01 microsecond. This interval of partial discharge is approximately one-tenth the period of recurrence determined by the described adjustment of condenser 22 and tap 23. After this discharge through the temporary conductance of tube 3, condenser 22 is recharged comparatively slowly from battery 18. A saw-tooth wave is thus generated which could be applied to the horizontal deflecting plates of the cathode ray oscilloscope, one of said plates being connected to point $L_1$ of switch $S_1$, that is, to the cathode 20 of tube 3, the other of said plates being grounded. Of course, such a saw-tooth voltage is unbalanced, and the means to transform it into a balanced voltage employed by the present invention will be later described.

The charge-discharge cycle of condenser 22 may be made to occupy time intervals varying from one-tenth to one-ten millionth of a second. To provide for this very wide range of sweep frequencies, condenser 22 is made variable from about 4 microfarads for a sweep frequency of the order of 10 cycles per second to complete disconnection where only a distributed capacity of some 10 micromicrofarads shunts potentiometer 21. Coarse adjustment of sweep frequency is made by variable condenser 22; fine adjustment by varying the setting of tap 23. At the lowest frequency all, at the highest some 5000 ohms, of the resistance of potentiometer 21 is in series between ground and cathode 20. When with suitable amplification the voltage appearing across condenser 22 is applied to the horizontal plates of the oscilloscope, sweep of the electron spot takes place during the charging fraction of the cycle, flyback during discharge.

During discharge of condenser 22 there simultaneously appear voltage pulses on grid 8 and on anode 6 of tube 3. The duration of these pulses is that of the partial discharge of condenser 22. These pulses, negative on anode 6, positive on grid 8, may themselves be transformed into saw-tooth voltage waves applicable to the horizontal plates of the oscilloscope and so are available alternatively with the voltage across condenser 22 as a control of electron spot movement.

Double-pole double-throw switch $S_1$ in the position shown in full line on Fig. 1 connects anode 6 and grid 8 of tube 3 to the input circuits of amplifying tubes 24 and 25, respectively. These amplifying tubes are suitably beam power tubes such as the RCA-807. Point $H_1$ of switch $S_1$ leads from anode 6 through stopping condenser 26 to grid 27 of tube 24, while point $H_1'$ leads from grid 8 through condenser 28 to grid 29 of tube 25. Condensers 26 and 28 have suitably each a capacitance of 0.1 microfarad. Tube 24 is provided with a grid leak 30 of approximately 250,000 ohms resistance. Bias voltage for the grid 27 is provided by cathode resistor 31 (say, 50 ohms) by-passed by condenser 33a of large capacity (say, 20 microfarads). Beam-forming plates 34 of tube 24 are joined to cathode 32, and screen grid 35 derives from battery 36 a potential of 250 volts above ground. For grid 29 of tube 25 a negative bias is obtained across cathode resistor 37, by-passed by condenser 33b, between cathode 41 and ground. Elements 37 and 33b are of the same values as elements 31 and 33a, respectively. Cathode 41 and beam-forming plates 42 are connected together directly to ground and screen grid 39 is made positive to ground by 250-volt battery 40. Grid leak 38 is similar to grid leak 30.

Anodes 43 of tube 24 and 44 of tube 25 are connected, respectively, to the mid-points of double-pole double-throw switch $S_2$. While switches $S_1$ and $S_2$ are shown widely separated in Fig. 1, they are in actual assembly joined together so that when $S_1$ selects the input connection to anode 6 and grid 8, as shown, switch $S_2$ at the same time connects grids 43 and 44 to the output circuits about to be described.

When $S_2$ is in the position shown in full lines, each of anodes 43 and 44 is connected to an inductance shunted by a capacitance and through these to the positive terminal of 250-volt battery 45, the negative terminal of which is grounded. As used for the purpose of this invention, condensers 46 and 47 are each variable between approximately 2000 micromicrofarads and the distributed capacity of the associated inductance. The inductances 48 and 49 are each variable from 20 henries to 0.1 henry. The highest sweep frequency is, of course, associated with the lowest simultaneous values of condensers 46 and 47 and of inductances 48 and 49. The circuit just described is preferred when the sweep frequency exceeds 100 kilocycles per second.

In the alternative pair of simultaneous switch positions, $L_1$ and $L_1'$ of $S_1$, $L_2$ and $L_2'$ of $S_2$, cathode 20 of tube 3 is connected through condenser 26 to grid 27 of tube 24 of which anode 43 is connected to a phase inverting circuit comprising condenser 50 in series with resistances 51 and 52 to ground. Condenser 50 may appropriately be of 0.1 microfarad capacity, while resistances 51 and 52 are, respectively, 1 megohm and 0.1 megohm. In this alternative circuit conductor 53 connects as shown the junction of resistances 51 and 52 and condenser 26. Tubes 24 and 25 are thus connected as a well-known phase inverting circuit described, for example, in United States Patent 2,246,168 to R. B. Dome, June 17, 1941. At the same time anodes 43 and 44 are connected to battery 45 through the 2 megohm resistances 54 and 55, respectively. This arrangement of the input and output circuits of tubes 24 and 25 is suitable for sweep frequencies below 100 kilocycles per second. In either position of switches $S_1$ and $S_2$, anodes 43 and 44 are connected through condensers 56 and 57 to horizontal deflecting plates A and A', respectively, of cathode ray oscilloscope CRO. Plates A and A' are connected to ground through resistances 58 and 59, respectively, which resistances are each suitably 10 megohms, while condensers 56 and 57 may conveniently each be of 0.01 microfarad capacitance.

The operation of the circuit preferred for the higher sweep frequencies is more readily explained by reference to Fig. 2. Here tubes 24 and 25 are symbolically represented by triodes. The negative voltage pulse arriving at grid 27 of tube 24 is represented by $e_1$ of Fig. 2A; the positive pulse simultaneously arriving at grid 29 of tube 25 by $e_2$ of Fig. 2B. In the multivibrator circuit described, trigger tube 3 has unity gain so these pulses are numerically equal but of opposite sign. Each of the inductances 48 and 49 is so chosen that its reactance is very large at the sweep frequency to be used. In this way, as taught by R. A. Heising in United States Patent 1,442,147, January 16, 1923, inductances are employed to maintain constant currents in the circuits supplied from battery 45.

Under these conditions, the negative voltage pulse arriving at grid 27 drives tube 24 momentarily to cut-off. Since the inductance 48 is traversed by constant current, the current extinguished in tube 24 appears as a momentary increase in the charge of condenser 46. After passage of the voltage pulse condenser 46 discharges at a constant rate through inductance 48. Accordingly, the voltage between anode 43 and ground undergoes a saw-tooth variation with time steeply rising during the existence of the negative pulse on grid 27 and thereafter more slowly falling toward the previously steady value until another steep rise is provoked by a new grid pulse.

Simultaneously, the positive voltage pulse on grid 29 of tube 25 renders this tube momentarily more highly conductive. Since constant current from battery 45 flows also in this circuit, the current of tube 24 increases at the expense of the charge of condenser 47. A fractional discharge of this condenser takes place during the existence of the positive pulse on grid 29 and after passage of the pulse condenser 47 recharges at a constant rate through inductance 49. The anode to ground voltage of tube 25 varies, therefore, in the same way as the corresponding voltage of tube 24 but in opposite phase thereto.

The variations of grid voltage $e_1$, anode current $i_1$, and anode voltage $e_{p1}$ of tube 24 are graphically shown in Fig. 2A; corresponding voltage and current variations of tube 25 $e_2$, $i_2$ and $e_{p2}$ are shown in Fig. 2B. It will be clear that plates A and A' of the oscilloscope connected respectively to anodes 43 and 44 receive balanced saw-tooth voltage waves of magnitude determined by the choice of tubes 24 and 25 and their associated circuit elements and of frequency determined by the adjustment of the cathode circuit of multivibrator tube 3.

Tubes 24 and 25 may be balanced in output by suitable choice of their grid biases. Their outputs are proportional to the duration of the voltage pulses and to the capacities of condensers 46 and 47. Since the pulse duration is approximately a constant fraction of the period of sweep, constancy of output of tubes 24 and 25 is effected by adjusting the capacities of condensers 46 and 47, increasing these capacities as the sweep frequency is decreased.

The circuit above-described is in principle suitable for any value of sweep frequency. However, at sweep frequencies below 100 kilocycles per second, inductances 48 and 49 must be inconveniently large to serve the purpose of maintaining constant current in their respective circuits from battery 45. Therefore, for the lower sweep frequencies it is convenient to make use of switches $S_1$ and $S_2$ to throw tubes 24 and 25 into the phase inverting circuit shown in Fig. 3. Here by suitable choice of resistors 51 and 52, voltage $e_2'$ on the grid of tube 25 may be made equal but opposite to voltage $e_1'$ in the grid of tube 24. Resistors 54 and 55 are appropriately each 2 megohms insuring the equality in magnitude of the output waves amplified with respect to grid voltage waves $e_1'$ and $e_2'$ which, as above described, are themselves of saw-tooth form arising between cathode 20 of tube 3 and ground. Figs. 3A and 3B respectively exhibit as functions of time the grid and plate voltages of tubes 24 and 25, respectively. Plates A and A' of the oscilloscope connected to anodes 43 and 44, respectively, are now, as in the connection previously described for the higher sweep frequencies, supplied with saw-tooth waves balanced to ground.

While the phase inverting circuit utilizing the saw-tooth voltage across condenser 22 is not theoretically limited to the lower sweep frequencies, it is not desirable to use this circuit for the frequencies of sweep much greater than 100 kilocycles per second. The saw-tooth voltage available at the cathode of the trigger tube of the multivibrator does not exceed 10 or 15 volts. At least 200 to 300 volts are required for horizontal deflection of the oscilloscope. Hence, a phase inverting amplifier with upwards of 26 decibel gain would be required. Its frequency range would be such that at least the tenth harmonic of the highest sweep frequency would have to be passed with negligible phase or amplitude distortion. With tubes available at present, such an amplifier would require a phase inverter and at least two or three high-power push-pull stages. Generating the sweep voltage directly at the plates of the cathode-ray oscilloscope by utilizing the positive and negative pulses already available in the multivibrator circuit eliminates this amplifier and the attendant increased drain on the power supply circuits.

The signal to be explored by means of the described sweep circuit is amplified as desired by the push-pull amplifier of Fig. 1 and applied to vertical plates B and B' of the oscilloscope. The sweep cycle may be synchronized with this signal by any well-known means, for example, through the synchronizing amplifier of Fig. 1 comprising a tube, suitably a 6AC7, the anode of which is connected through a stopping condenser to anode 7 and grid 8 of tubes 2 and 3, respectively. The grid of the synchronizing tube is itself supplied through switch S₃ from any desired external voltage source or from a power supply or from the amplified signal to be examined. The use of a synchronizing tube in such a connection is well understood and requires herein no detailed description.

From the foregoing description of the invention, it will be readily seen that means are provided whereby the horizontal deflecting plates of the cathode ray oscilloscope are in all cases supplied with saw-tooth potentials balanced to ground and all the recurrent voltages made available by the operation of multivibrator I are made use of with the maximum economy of apparatus together with means for selecting the source of recurrent voltage and amplifying circuit therefor best suited to the frequency desired for the sweep.

While the tubes and circuit constants described in the foregoing illustrate a satisfactory embodiment of the present invention, it is to be understood that those familiar with the art may find other and equally useful tubes and circuit elements and employ such without ceasing to use this invention.

What is claimed is:

1. In a circuit including a cathode ray oscilloscope provided at least with a pair of sweep plates, means for generating balanced saw-tooth voltages on said sweep plates including a multivibrator comprising a first and a second vacuum tube, said first and second tubes having each at least an anode, a control grid and a cathode in circuit with which is a cathode resistor, a pair of amplifying vacuum tubes having each at least an anode, a control grid and a cathode, switching means coupling in a first switch position the control grids of said amplifying tubes in push-pull relationship individually to the anodes of said first and second tubes and coupling in a second switch position said amplifying tubes in phase inversion relationship, the control grid of one of said amplifying tubes being connected in parallel with the cathode resistor of said second tube.

2. In a cathode ray sweep circuit including a multivibrator generating a plurality of recurrent voltages of controlled frequency of recurrence, means for deriving balanced saw-tooth voltage waves from said recurrent voltages comprising a pair of amplifying vacuum tubes, an input circuit and a first and a second output circuit for each of said tubes, and switching means selecting in a first switch position the first output circuit for each of said tubes and simultaneously coupling said input circuits individually to the sources of a first and a second recurrent voltage of said multivibrator, and selecting in a second switch position the second output circuit for each of said tubes and simultaneously coupling the input circuit of one of said tubes to the source of a third recurrent voltage of said multivibrator and the input circuit of the other of said tubes to the second output circuit of said one tube.

3. In a cathode ray sweep circuit including a multivibrator generating a plurality of recurrent voltages and comprising a first and a second vacuum tube, said second vacuum tube having at least a control grid, a cathode and an anode, means for deriving balanced saw-tooth voltage waves from said multivibrator comprising a third and a fourth vacuum tube having each at least a control grid, a cathode and an anode, an input circuit for each of said third and fourth vacuum tubes, coupling between the control grid of said second tube and the control grid of said third vacuum tube, coupling between the anode of said second vacuum tube and the control grid of said fourth vacuum tube, and output circuits for each of said third and fourth vacuum tubes, said output circuits each comprising in parallel connection an inductance and a capacitance.

4. In a cathode ray sweep circuit, the method of providing balanced saw-tooth sweep voltages of desired frequency which comprises generating a plurality of recurrent voltages of controlled frequency of recurrence, at least two of said recurrent voltages being opposite in phase to each other, selecting for sweep frequencies greater than a chosen frequency said two recurrent voltages of opposite phase and transforming said two voltages into equal and oppositely phased voltages of saw-tooth form, and selecting for sweep frequencies of and less than said chosen frequency a third recurrent voltage and transforming said third voltage by phase inversion into equal and oppositely phased voltages of saw-tooth form.

WILLIAM A. EDSON.
JAMES O. EDSON.
JOHN B. MAGGIO.